(12) United States Patent
Linkies et al.

(10) Patent No.: US 6,565,347 B1
(45) Date of Patent: May 20, 2003

(54) EXTRUDER DIE HEAD

(75) Inventors: Juergen Linkies, Lienen (DE); Hans-Udo Beckmann, Luedenscheid (DE); Dieter Aus Dem Moore, Hoerstel (DE)

(73) Assignee: Windmöller & Hölscher, Lengerich (DE)

( * ) Notice: Subject to any disclaimer, the term of this patent is extended or adjusted under 35 U.S.C. 154(b) by 0 days.

(21) Appl. No.: 09/580,569

(22) Filed: May 30, 2000

(30) Foreign Application Priority Data

May 28, 1999 (DE) .......................... 199 24 540

(51) Int. Cl.[7] .............................................. B29C 47/20
(52) U.S. Cl. ...................... 425/190; 425/380; 425/467
(58) Field of Search ............................... 425/133.1, 190, 425/192 R, 380, 381, 467

(56) References Cited

U.S. PATENT DOCUMENTS

| | | | |
|---|---|---|---|
| 3,697,211 A | * 10/1972 | Chisholm | 425/191 |
| 3,856,448 A | * 12/1974 | Iijima et al. | 425/133.1 |
| 4,298,325 A | * 11/1981 | Cole | 425/192 R |
| 5,076,776 A | * 12/1991 | Yamada et al. | 425/133.1 |
| 5,261,805 A | * 11/1993 | Gates | 425/380 |
| 6,050,805 A | * 4/2000 | Lupke | 425/192 R |

OTHER PUBLICATIONS

Green, Don W., Perry's Chemical Engineers' Handbook, Seventh Edition, 1997, McGraw–Hill, NY, pp. 10–118 to 10–119.*

* cited by examiner

*Primary Examiner*—Jan H. Silbaugh
*Assistant Examiner*—Joseph Leyson
(74) *Attorney, Agent, or Firm*—Jacobson Holman PLLC

(57) ABSTRACT

An extruder die head comprises an internal cylindrical mandrel and a shell, which encloses said mandrel concentrically. Between said mandrel and shell an annular channel is formed that empties into the die slit. A polymer melt is fed through a line to the annular channel. To prevent the polymer melt in the area of the start of the annular channel from penetrating into a slit that forms between the mandrel and the shell due to heat expansion, there is between both mandrel and shell a ring with such a coefficient of thermal expansion that when heated up due to the polymer melt said ring seals the slit between the shell and the mandrel.

8 Claims, 1 Drawing Sheet

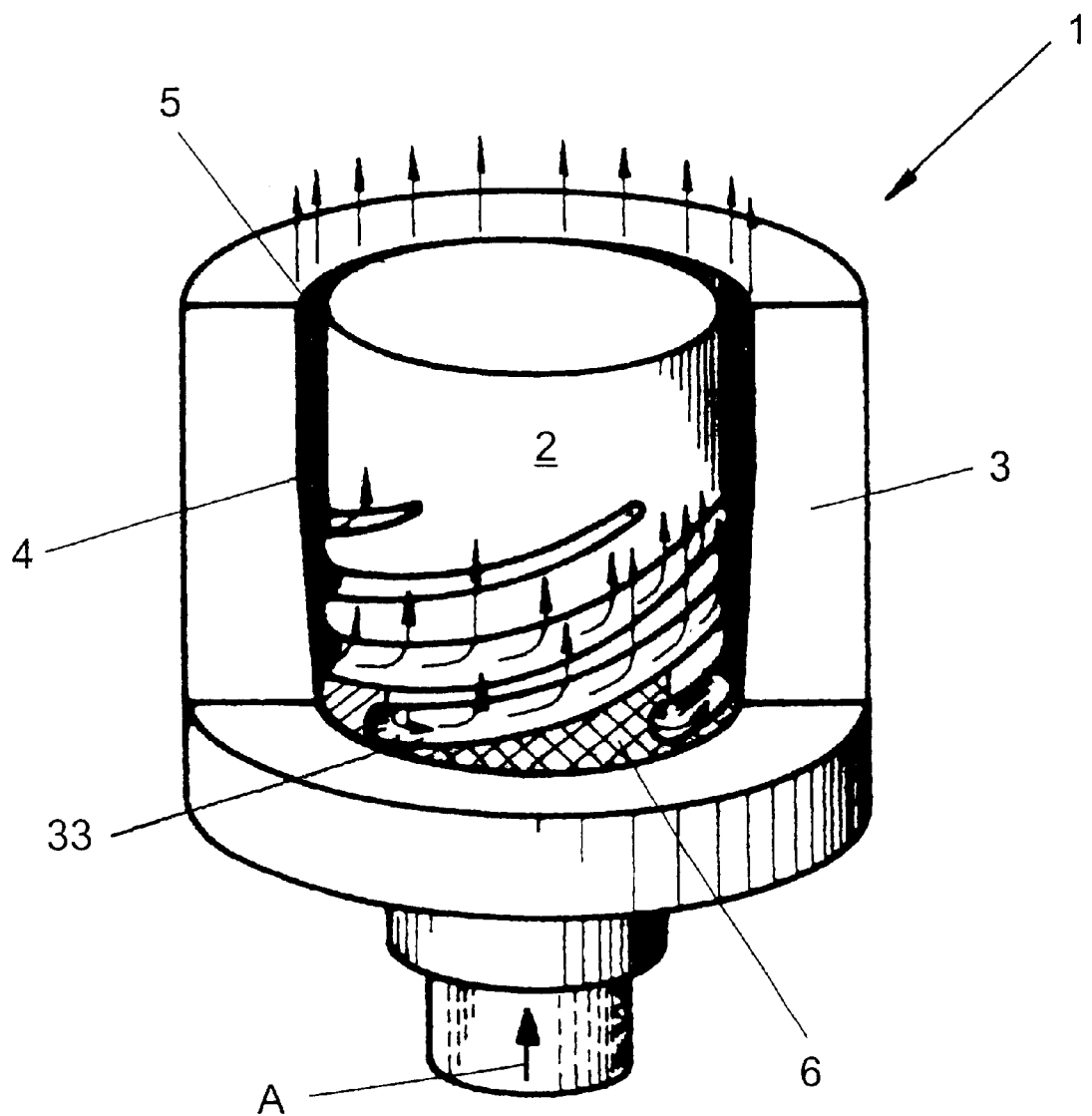

EXTRUDER DIE HEAD

BACKGROUND OF THE INVENTION

1. Field of the Invention

The invention relates to an extruder die head, preferably a blown film head for mono and/or coextrusion. The extrusion die head comprises at least one internal cylindrical mandrel and a shell, which encloses the mandrel concentrically. Between the mandrel and shell an annular channel is formed that empties into a die slit. The extruder die head also comprises at least one line, which feeds a polymer melt and empties into the annular channel in the area opposite the die slit.

2. Related Art

This type of blown film head is well-known. Usually the mandrel exhibits one or several spiral grooves, whose depth tapers off in the direction of the die slit starting from the feed channel(s), so that the polymer melt overflows more and more the spider legs defining the channels and assumes uniform flow in the axial direction. One particular problem associated with these prior art extruder die heads lies in the fact that the mandrel opposite the start of the annular channel is fitted sealingly into a cylindrical borehole of the shell. If, however, the extruder die head heats up due to the polymer melts flowing through the same, the shell expands more, due to its larger diameter, than the central mandrel, so that between both mandrel and shell a slit is formed, into which flows the polymer melt, which is fed in under pressure. Since the melt collects in the region of this slit and decomposes in the hot die head due to its long residence time, particles of the deposited melt can be dragged along by the melt. These particles appear again as defective spots in the extruded film blown tube or the inflated tubular bubble.

SUMMARY OF THE INVENTION

Therefore, the object of the invention is to provide an extruder die head of the kind described above, in which no slit can form, during the heating process, between the central mandrel and the shell, which encloses it and in which the polymer melt can accumulated and be deposit and become brittle, are avoided.

The invention solves this problem in that the area of the start of the annular channel between the mandrel and the shell exhibits a ring with such a coefficient of thermal expansion γ that during the heating process it seals the slit between the shell and the ring.

The ring of the invention exhibits a different coefficient of thermal expansion γ than the material of the mandrel and the shell so that due to the greater thermal expansion of the shell the ring seals the slit between mandrel and shell just like a press fit packing.

Preferably a ring, whose coefficient of thermal expansion is greater than that of the shell, is mounted on the mandrel.

Another embodiment provides that a ring, which exhibits a smaller coefficient of thermal expansion than the shell, is mounted on the inside wall of the shell.

A preferred embodiment provides that the rings are held in annular shoulders of the mandrel and/or the shell. In order to slide the rings on, the shell can be provided with a borehole of larger diameter and/or the mandrel with a smaller diameter up to the step shaped shoulder. The rings rests, on the one hand, with one face against the face of the annular shoulder and, on the other hand, with its outer or inner circumference against the shell or the mandrel in the recess.

If the mandrel and the shell are made of steel or a steel alloy, the ring is made preferably of copper, a copper alloy, bronze, brass or a brass alloy.

Another embodiment solves the problem in that the mandrel and the shell, enclosing it, exhibit in such a manner different coefficients of thermal expansion that the seat, which connects the mandrel to the shell and is located below the annular channel, becomes more impervious with heat. In this embodiment the force fit between the mandrel and shell is increased so that any slits that might still be present in the seat area are closed.

Another embodiment solves the problem in that a pipe piece having such coefficients of thermal expansion that the seat, which connects the mandrel to the shell and is located below the annular channel, becomes more impervious with heat, is shrunk into the shell.

Another embodiment solves the problem in that a pipe piece having such coefficients of thermal expansion that the seat, which connects the mandrel to the shell and is located below the annular channel, becomes more impervious with heat, is shrunk on the mandrel. In this case, too, the press fit becomes more impervious so that slits are prevented.

One or several helical groove(s) having a depth that tapers in the direction of the die slit can be milled into the pipe piece or through the pipe piece into the mandrel.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE DRAWING

One embodiment of the invention is explained in detail below with reference to the drawing, which is a perspective view of the blown film head whose outer shell is partially removed.

DESCRIPTION OF THE INVENTION

Although only a few preferred embodiments of the invention are explained in detail, it is to be understood that other embodiments are possible. Accordingly, it is not intended that the invention is to be limited in its scope to the details of construction and arrangement of components set forth in the following description or illustrated in the drawings. The invention is capable of other embodiments and of being practiced or carried out in various ways. Also, in describing the preferred embodiments, specific terminology will be resorted to for the sake of clarity. It is to be understood that each specific term includes all technical equivalents which operate in a similar manner to accomplish a similar purpose.

The circumference of the mandrel 2 exhibits several spiral grooves 33, whose depth tapers off in the direction of the die slit 5 starting from the start of the annular channel 4. The grooves 33 terminate at a distance from the die slit 5. The die head 1 is provided with an axial feed channel for the polymer melt, which is fed in the direction of arrow A through the feed channel. The feed channel empties in the start area of the spiral grooves 33 so that the melt is feed in the direction of the spiral grooves 33. As the height of the groove decreases in the direction of the arrow, the melt is deflected in the axial direction over the legs separating the grooves 33.

In the starting area of the annular channel 4 and opposite it a sealing ring 6 is inserted into a recess of the inside wall of the shell 3 and/or a recess of the mandrel 2. The sealing ring exhibits a different coefficient of thermal expansion γ than the mandrel 2 and the shell 3. The ring's coefficient of thermal expansion is adjusted in such a manner to that of the mandrel 2 or the shell 3 that the ring forms a sealing packing when, as the blown film head heats up, the shell 3 expands more than the mandrel 2 due to the larger diameter of the shell.

The extruder die head 1 is preferably a blown film head for mono and/or coextrusion. The extruder die head 1 comprises the internal cylindrical mandrel 2 and the shell 3, which encloses the mandrel concentrically. Between the mandrel 2 and shell 3, the annular channel 4 is formed that empties into the die slit 5. The extruder die head 1 also comprises at least one spiral groove 33, which feeds the polymer melt and empties into the annular channel 4 in an area opposite the die slit 5. The area at the start of the annular channel 4 between the mandrel 2 and the shell 3, includes the sealing ring 6 which has such a coefficient of thermal expansion γ that during the heating process the ring seals the slit between the inside wall of shell 3 and the adjacent outside wall of mandrel 2.

If the ring 6 exhibits a higher coefficient of thermal expansion than the shell 3, the ring is mounted on the mandrel 2. Alternatively, if the ring 6 exhibits a smaller coefficient of thermal expansion than the shell, the ring is mounted on an inside wall of the shell 3.

The ring 6 is held in annular shoulders of the mandrel 2 and/or the shell 3. The mandrel 2 and the shell 3 are made of steel or a steel alloy, and the ring 6 is preferably made of copper, a copper alloy, bronze, brass or a brass alloy.

The mandrel 2, and the shell 3 enclosing it, can exhibit such a manner of different coefficients of thermal expansion that a seat, which connects the mandrel 2 to the shell 3, and is located below the annular channel 4, becomes more impervious with heat.

In one embodiment, in the extruder head 1, a pipe piece is shrunk into the shell. The pipe piece has a coefficient of thermal expansion that a seat, which connects the mandrel 2 to the shell 3 and is located below the annular channel 4, becomes more impervious with heat.

In another embodiment, in the extruder head 1, a pipe piece is shrunk on the mandrel 2. The pipe piece has a coefficient of thermal expansion that the seat, which connects the mandrel 2 to the shell 3 and is located below the annular channel 4, becomes more impervious with heat. In this embodiment, one or several helical groove(s) having a depth that tapers in the direction of the die slit 5 is (are) milled into the shrunk on pipe piece or through the pipe piece into the mandrel 2.

The foregoing is considered as illustrative only of the principles of the invention. Further, since numerous modifications and changes will readily occur to those skilled in the art, it is not desired to limit the invention to the exact construction and operation shown and described, and, accordingly, all suitable modifications and equivalents may be resorted to, falling within the scope of the invention.

What is claimed is:

1. An extruder die head having at least one internal cylindrical mandrel and a cylindrical shell, which encloses concentrically said mandrel, an annular channel formed between said mandrel and said shell for emptying into a die slit, at least one line, which feeds a polymer melt into said annular channel in an area opposite said die slit, the improvement comprising:
   a ring having a coefficient of thermal expansion γ and positioned between a part of an outer surface of said mandrel and a part of an inner surface of said shell, and in said area of said annular channel for sealing said area between said shell and said mandrel, said ring formed by a pipe piece shrunk into said shell, and said pipe piece having such coefficients of thermal expansion that a seat, which connects said mandrel to said shell and is located below said annular channel, becomes more impervious with heat.

2. The die head, as claimed in claim 1, wherein said ring, exhibits a smaller coefficient of thermal expansion than said shell.

3. The die head, as claimed in claim 1, wherein said mandrel and said shell are made of steel or a steel alloy, and said ring is made of copper, a copper alloy, bronze, brass or a brass alloy.

4. The extruder die head, as claimed in claim 1, wherein at least one helical groove has a depth that tapers in a direction of said die slit and said at least one helical groove is milled into said shrunk on pipe piece or through said pipe piece into said mandrel.

5. An extruder die head having at least one internal cylindrical mandrel and a cylindrical shell, which encloses concentrically said mandrel, an annular channel formed between said mandrel and said shell for emptying into a die slit, at least one line, which feeds a polymer melt into said annular channel in an area opposite said die slit, the improvement comprising:
   a ring having a coefficient of thermal expansion γ and positioned between a part of an outer surface of said mandrel and a part of an inner surface of said shell, and in said area of said annular channel for sealing said area between said shell and said mandrel, said ring formed by a pipe piece shrunk on said mandrel, and said pipe piece having such coefficients of thermal expansion that a seat, which connects said mandrel to said shell and is located below said annular channel, becomes more impervious with heat.

6. The die head, as claimed in claim 5, wherein said ring exhibits a higher coefficient of thermal expansion than said shell.

7. The extruder die head, as claimed in claim 5, wherein said mandrel and said shell are made of steel or a steel alloy, and said ring is made of copper, a copper alloy, bronze, brass or a brass alloy.

8. The extruder die head, as claimed in claim 5, and further comprising at least one helical groove having a depth that tapers in a direction of said die slit being milled into said shrunk on pipe piece or through said pipe piece into the mandrel.

* * * * *